No. 773,636. PATENTED NOV. 1, 1904.
H. A. FRASCH.
PROCESS OF RECOVERING NICKEL OXID AND AMMONIA.
APPLICATION FILED AUG. 30, 1904.
NO MODEL.
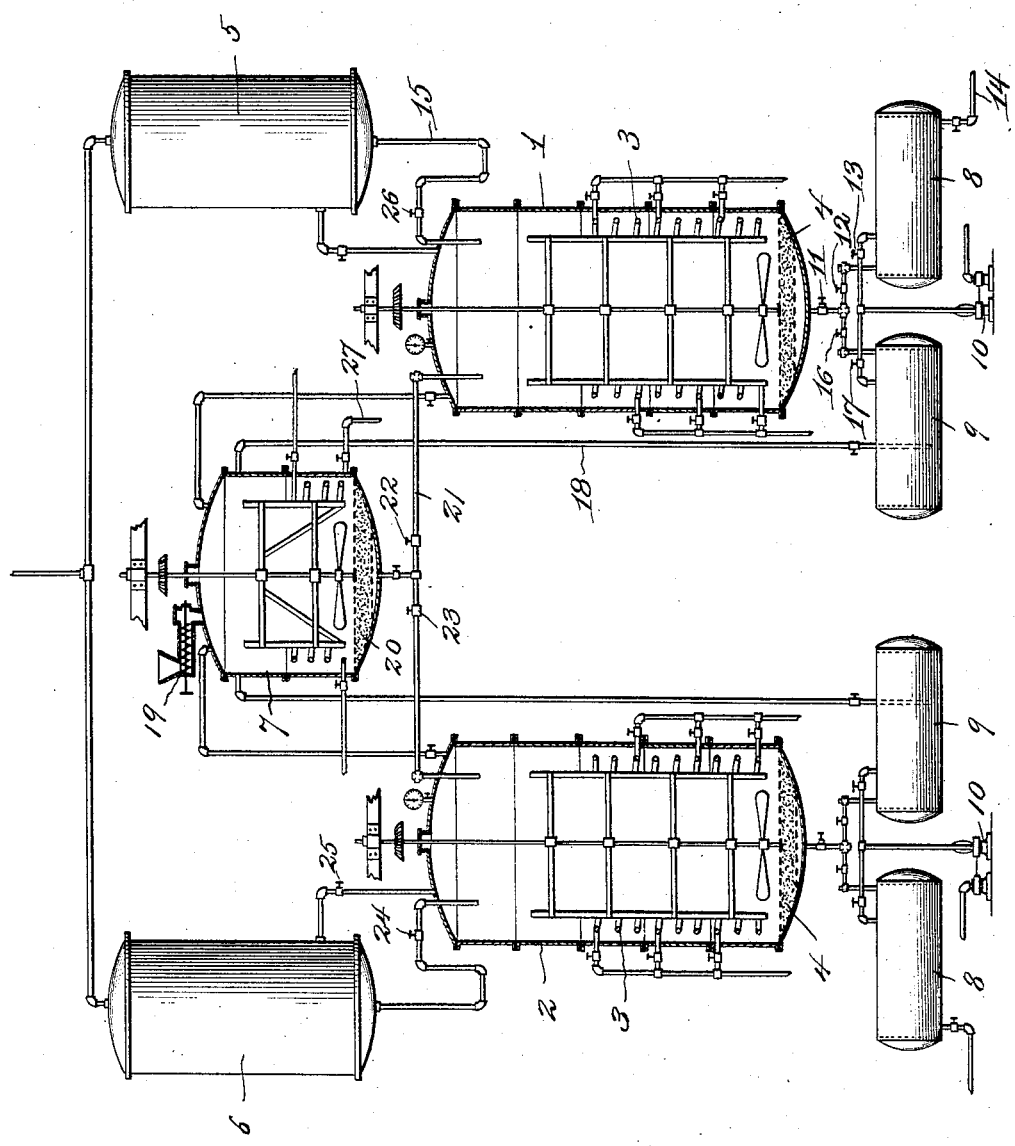
Witnesses:
Inventor:
Hans A. Frasch.
by Wm H. Pinckel
his Attorney No. 773,636. Patented November 1, 1904.

UNITED STATES PATENT OFFICE.

HANS A. FRASCH, OF NEW YORK, N. Y.

PROCESS OF RECOVERING NICKEL OXID AND AMMONIA.

SPECIFICATION forming part of Letters Patent No. 773,636, dated November 1, 1904.

Application filed August 30, 1904. Serial No. 222,748. (No specimens.)

*To all whom it may concern:*

Be it known that I, HANS A. FRASCH, a citizen of the United States, residing at New York, in the county of New York and State of New York, have invented a certain new and useful Improvement in Methods of Recovering Nickel Oxid and Ammonia, of which the following is a full, clear, and exact description.

In Patent No. 763,053, granted to me under date of June 21, 1904, I describe a method of recovering nickel oxid and ammonia from nickel ammonium chlorid.

As stated in the patent referred to, the invention may be carried out in a variety of ways, and in addition to these I may proceed in any of the following methods: The nickel ammonium chlorid is distilled in presence of a dehydrating or water-absorbing agent, preferably a calcium-chlorid solution saturated with common salt, whereby the ammonia is liberated and recovered and the nickel oxid, more or less hydrated, is separated. The or a portion of the distilling fluid is then removed from the nickel oxid and treated with calcium oxid, caustic soda, or other reagent which will react with the ammonium chlorid contained in the distilling fluid in order again to liberate ammonia and produce, with the nickel remaining in solution in the distilling fluid, nickel ammonium chlorid, whereupon it is again subjected to distillation in the same or any other suitable apparatus, or a part of the distilling fluid may be removed at any time while distillation is progressing, treated with calcium oxid or other equivalent reagent, and returned to the still, and these operations may be repeated until all or any desired quantity of the nickel has been precipitated and the ammonia removed, or the distilling fluid may be repeatedly removed, treated, and distilled until all or any desired quantity of the nickel oxid and ammonia have been removed, and then the distilling fluid is charged with fresh nickel ammonium chlorid and the distillation renewed, or the nickel ammonium chlorid may be subjected to distillation in presence of a calcium-chlorid solution previously saturated with common salt. Then the resulting ammonium chlorid, with the distilling fluid, may be removed from the nickel oxid and treated with calcium oxid and distilled, and then, again, the ammonia removed and nickel oxid precipitated, the distilling fluid eventually removed from the nickel oxid, and fresh quantities of nickel ammonium chlorid and calcium oxid added, and by repeating these operations of distillation and addition of calcium oxid constantly enriching the distilling fluid with calcium chlorid to any desired degree before finally removing it from the process. These and other methods may be followed in accordance with the generic invention in recovering nickel oxid and ammonia from nickel ammonium chlorid and commercially producing caustic-soda solution.

In the accompanying drawing, illustrating my invention, I have shown a preferred form of multiple still in sectional elevation; but I wish it understood that I do not limit the invention to this particular apparatus.

The apparatus consists of the distilling vessels 1 and 2, which are equipped with stirrers, steam-coils 3, and filter-bottoms 4, and which may be used alternately or simultaneously, the condensers 5 and 6 equipped on the reflux principle, the treating-tank 7, which also is equipped to serve as filter, and the monte-jus 8 and 9, together with the air-pump 10, all connected by suitable pipes.

To carry out the process, I charge the vessel 1 with the proper quantity of ammoniated salt brine and nickel oxid and agitate the contents until reaction is completed. The result is caustic-soda solution and nickel ammonium chlorid, which latter is insoluble in the caustic-soda solution. The valves 11, 12, and 13 of the vessel 1 are then opened and the air is exhausted from the vessel 8 by the pump 10, when the caustic-soda solution filtering through the filter-bottom 4, which may consist of common salt or sand, is drawn into the vessel 8. In place of exhausting the air from the vessel 8 and filtering by means of vacuum the exhaust of the air-pump 10 may be connected with the top of the vessel 1 and filtration be conducted under pressure. When the caustic liquor has been removed from the vessel 1 into the vessel 8, it is delivered through pipe 14 to suitable storage-receptacles. The nickel ammonium chlorid remaining in the vessel 1 may then be washed with ammoniated salt brine for the purpose of displacing and removing what caustic soda is adhering to it, the wash fluid being removed also by means of the monte-jus 8 and delivered to storage vessels through pipe 14, whence it may be delivered to the vessel 2 to be treated with nickel oxid. To the nickel ammonium chlorid remaining in vessel 1 is then added a solution of calcium chlorid saturated with common salt and which may contain from twenty to fifty per cent. or more of calcium chlorid and a quantity of ammonium chlorid approximately equivalent to the amount of caustic soda still present with the nickel ammonium chlorid. The contents of the vessel 1 are then agitated and heated to boiling by means of the steam-coils or other suitable means, when the ammonia is evaporated and conducted from the condenser 5 to suitable absorbers, where it is used to again produce ammoniated salt brine. The steam escaping with the ammonia-vapors and which is condensed in the condenser 5 is returned to the vessel 1 by pipe 15. During the distillation of the ammonia nickel oxid more or less hydrated is precipitated in the vessel 1. The valves 11, 16, and 17 are then opened, valves 12 and 13 having previously been closed and the liquid contents of the vessel 1 are withdrawn through the filter-bottom 4 into the monte-jus 9 and delivered to the treating-tank 7 through pipe 18, the nickel oxid being retained in the vessel 1. When any desired quantity of the distilling liquor from still 1 has been delivered to the vessel 7, it is then treated with sufficient calcium oxid, which I prefer to introduce in powdered form, through the conveyer 19 to again transform the nickel which may yet be present in solution into nickel ammonium chlorid by means of the ammonia liberated by reaction of the calcium oxid upon ammonium chlorid, which latter may be present in the liquor from prior operations or from the decomposition of the charge of nickel ammonium chlorid then in operation. The treated liquor is filtered through the filter-bottom 20 of vessel 7, said filter-bottom consisting of common salt or sand, and is returned to the distilling vessel 1 by the pipe 21, where it is again subjected to distillation. Thus periodically or continuously quantities of the liquid contents of the distilling apparatus are withdrawn from the distilling vessel 1, treated with calcium oxid in the vessel 7 and returned to the still 1, until the nickel which has been in solution has been precipitated as oxid. The calcium-chlorid solution is then finally removed from the nickel oxid by closing the valve 22 of the vessel 7 and opening the valve 23, delivering the liquor coming from vessel 7 to the vessel 2, where it is again mixed with fresh nickel ammonium chlorid. The nickel oxid remaining in vessel 1 is then washed with salt brine or water and again brought in reaction with fresh quantities of ammoniated salt brine. Thus while the vessel 2 is used for distilling purposes, the valves 24 and 25 being open, the vessel 1 is used for conversion, the valve 26 being closed, and vice versa.

The distilling and treating operation may be continued until all the ammonium chlorid has been decomposed and the ammonia removed, or it may be discontinued after the nickel or as much as is desired has been precipitated, when the still liquor may be again charged with fresh nickel ammonium chlorid, and this may be done repeatedly until the concentration of the calcium-chlorid solution, resulting from the repeated treatment with calcium oxid and consequent constant fresh production of calcium-chlorid, has increased to the limit of practicability, when finally enough of the calcium-chlorid liquor is withdrawn from the process and replaced by salt brine to reduce it to its original strength and normal quantity. Thus the total quantity of the liquid contents of the vessel 1 may be treated at one time or continuously, or periodically smaller quantities of the liquid may be withdrawn, treated, and returned to the distilling apparatus, until all or as much as is desired of the nickel and ammonia have been recovered.

Instead of returning the treated liquor to the vessel 1 it may be turned at any stage of the process into another or consecutively into a series of other similar vessels or distilling apparatus, and fresh liquor may in its place be added to the vessel 1, as its liquid contents are withdrawn.

The impurities contained in the calcium oxid are collected on the filter 20 of the vessel 7 and periodically removed through outlet 27.

Instead of equipping the vessels 1 and 7 with filter-bottoms, separate filters may be used. Again, instead of treating the distilling liquor with calcium oxid to reconvert the nickel, which may be in solution to nickel ammonium chlorid, caustic soda or any other equivalent reagent may be used.

What I claim is—

1. The method of recovering nickel oxid and ammonia from nickel ammonium chlorid, consisting in subjecting the nickel ammonium chlorid to distillation in presence of a dehydrating agent, thereby expelling ammonia and precipitating nickel oxid, removing the distilling fluid from the nickel oxid, treating it with calcium oxid, and subjecting it again to distillation.

2. The method of recovering nickel oxid and ammonia from nickel ammonium chlorid, consisting in subjecting the nickel ammonium chlorid to distillation in presence of a dehydrating agent, thereby expelling ammonia and precipitating nickel oxid, removing from the nickel oxid while distillation is proceeding, parts only of the distilling fluid, treating the removed fluid constituents with calcium oxid, and returning the treated fluid to the distilling vessel.

3. The method of recovering nickel oxid and ammonia from nickel ammonium chlorid, consisting in subjecting the nickel ammonium chlorid to distillation in presence of a dehydrating agent, thereby expelling ammonia and precipitating nickel oxid, repeatedly removing from the nickel oxid while distillation is proceeding, parts only of the distilling fluid, treating same with calcium oxid and again distilling the fluid until all or any desired quantity of the nickel oxid and ammonia has been separated, charging the distilling fluid again with fresh nickel ammonium chlorid and again subjecting same to distillation.

4. The method of recovering nickel oxid and ammonia from nickel ammonium chlorid, consisting in subjecting the nickel ammonium chlorid to distillation in presence of a calcium-chlorid solution previously saturated with common salt, removing the resulting ammonium chlorid with the distilling fluid from the nickel oxid, treating it with calcium oxid, and by distillation again removing the ammonia and precipitating nickel oxid, eventually removing the distilling fluid from the nickel oxid, adding to it fresh quantities of nickel ammonium chlorid and calcium oxid, and by repeating these operations of distillation and addition of calcium oxid constantly enriching the distilling fluid with calcium chlorid to any desired degree before finally removing it from the process.

In testimony whereof I hereunto set my hand this 24th day of August, A. D. 1904.

HANS A. FRASCH.

Witnesses:
JOSEPH WITTNER,
E. P. ROBERTSON.